United States Patent [19]

Tonner et al.

[11] 4,262,027
[45] Apr. 14, 1981

[54] METHOD OF PROCESSING MEAT

[75] Inventors: George F. Tonner, Mission Hills; John M. Wolcott, Burbank; both of Calif.

[73] Assignee: Carnation Company, Los Angeles, Calif.

[21] Appl. No.: 32,626

[22] Filed: Apr. 23, 1979

Related U.S. Application Data

[63] Continuation-in-part of Ser. No. 856,525, Dec. 1, 1977, abandoned.

[51] Int. Cl.³ .................................................. A23B 4/00
[52] U.S. Cl. ...................................... 426/325; 426/99; 426/332; 426/643; 426/644; 426/645
[58] Field of Search .................. 426/99, 332, 325, 643, 426/644, 645

[56] References Cited

U.S. PATENT DOCUMENTS

| | | | |
|---|---|---|---|
| 3,328,178 | 6/1967 | Alderton | 426/332 |
| 3,692,534 | 9/1972 | Meno | 426/99 X |
| 3,985,904 | 10/1976 | Bernotavicz | 426/332 |
| 4,011,345 | 3/1977 | Bartoch | 426/332 X |
| 4,018,909 | 4/1977 | Foulkes | 426/332 X |

FOREIGN PATENT DOCUMENTS

| | | | |
|---|---|---|---|
| 48-17064 | 5/1973 | Japan | 426/99 |
| 48-17065 | 5/1973 | Japan | 426/99 |

OTHER PUBLICATIONS

Lopez, A Complete Course in Canning, 10th Ed., 1975, The Canning Trade: Baltimore, pp. 193,608–193,614.
Whistler et al., 2nd Ed., Industrial Gums, 1973, Academic Press, New York, pp. 94, 327, 328.
Whister et al., Industrial Gums, 1st Ed., 1959, Academic Press, New York, pp. 97, 98, 366.
Hawley, The Condensed Chemical Dictionary, 8th Ed., 1971, Van Nostrand Reinhold Co., New York, p. 419.

*Primary Examiner*—Joseph M. Golian
*Attorney, Agent, or Firm*—Eugene C. Ziehm; Robert D. Kummel

[57] ABSTRACT

A method of producing a meat emulsion product which is uniformly acidified throughout to an equilibrium pH value of 4.6 or below under conditions which prevent acid denaturation of the protein matrix of the emulsion prior to cooking of the emulsion, to thereby prevent breaking of the emulsion and separation of fat in the product. An edible acidogen is incorporated in the emulsified meat mix in an amount sufficient to reduce the pH of the emulsion to 4.6 or below by the time cooking of the emulsion is completed. Denaturation of the protein in the meat emulsion prior to cooking of the emulsion is prevented by incorporating in the emulsion a water soluble hydrocolloid with the acidogen or by the addition of an acidogen which is encapsulated with a material which delays formation of acid until cooking of the emulsion. After cooking, the acidified, set emulsion is combined with other foods having an equilibrium pH of 4.6 or below in suitable containers and heat processed under conditions sufficient to destroy acid tolerant microorganisms, such as 212° F. for 10 to 15 minutes, to provide a commercially sterile, canned, meat-containing product. The relatively mild heat processing conditions used do not adversely affect the taste, texture, color or appearance of the meat or other ingredients of the product.

24 Claims, No Drawings

METHOD OF PROCESSING MEAT

RELATED APPLICATIONS

This is a continuation-in-part of co-pending application Ser. No. 856,525, filed Dec. 1, 1977 now abandoned.

BACKGROUND OF THE INVENTION

This invention relates to a method of processing meat to provide a product having improved microbial stability. More particularly, the invention relates to a method of producing a commercially sterile meat-containing product which is heat processed under conditions which do not adversely affect the flavor, texture, color or appearance of the meat or other ingredients of the product.

Canned low acid foods which are commercially available, generally are heat processed by retorting to prevent microbiological spoilage so that the product, at room temperature, will remain unspoiled indefinitely from a microbiological standpoint. Such canned foods are heat processed to render the product "commercially sterile," which term is defined to mean that degree of sterility at which all pathogenic and toxinforming organisms have been destroyed, as well as other more resistant types which, if present, could grow in the product and produce spoilage under normal storage conditions.

The problems of meat canners in producing sterile canned meat products are often more acute than with producers of other products in the commercial canning industry because meat products are low-acid foods, that is, they have pH of 5.3 and above. It is well known that the heat processing conditions required to produce a commercially sterile product are, in part, dependent upon the acidity of the food being processed. Thus, it is recognized that foods having a pH of 4.6 or below may be heat processed under relatively mild conditions to provide a sterile canned product, since acid-tolerant organisms can, in practically all cases, be destroyed by subjecting acid foods or high acid foods to a short heat process at about 212° F. However, the growth of some microorganisms, such as *Clostridium botulinum*, is inhibited only in foods having a pH of 4.6 or below and are a health hazard in foods having a pH of above 4.6, including meat and meat products. Such foods having a pH of above 4.6 require high heat processing temperatures for extended periods of time in order that all viable microorganisms are destroyed or rendered dormant. Thus, canned foods having a pH of above 4.6 must be given a minimum safe cook, which for practical purposes is considered to be one having a $F_0$ of 2.78, that is, is equal in destructive effect on *Clostridium botulinum* to 2.78 minutes at 250° F., assuming instantaneous heating and cooling. However, such severe heat treatment often results in noticeable changes in flavor, texture and color of meat products.

Several alternative techniques have been suggested heretofore for the production of commercially sterile meat products without subjecting the meat to severe thermal processing. For example, U.S. Pat. No. 3,886,296 discloses subjecting particulate low acid foods to an acid blanch for a period of time sufficient to reduce the overall pH of the food to below 5.0 and then immersing the acid blanced food particles in an acidic liquid phase, such as a sauce or gravy, having a pH of below 4.5, in a suitable container. Due to the acid blanching of the food and the fact that the food is surrounded in the container by an acidic liquid phase, the food particles in the container have an overall pH of 4.6 or below within about 30 minutes, so that the food particles may be heat processed at relatively low temperatures for short periods of time. While this procedure is effective in reducing the thermal processing required to produce a commercially sterile product, it is subject to some disadvantages which tend to limit the use of this procedure in the production of sterile canned meat products. For example, such acidification of meat particles is a relatively slow process which is limited by the rate of hydronium ion diffusion into the meat and influenced by the size and type of meat. Unless the meat particles are small in size, it is difficult to obtain the uniform distribution of acid throughout the meat which is required to enable the meat to be heat processed under relatively mild conditions. Meat, other than pieces which are relatively small in size, are difficult to acidify by the process, thereby limiting the type of canned meat-containing product which may be produced.

SUMMARY OF THE INVENTION

The present invention provides a method of producing a meat product which is uniformly acidified throughout the meat to an equilibrium pH of 4.6 or below prior to the completion of cooking, and in which the acidified meat is used in the production of a commercially sterile canned meat containing product which is heat processed under conditions which do not adversely affect the flavor, texture, color or appearance of the meat or other ingredients of the product. Thus, the invention provides a high acid meat emulsion product which is stable to coalescence during and subsequent to formation of the emulsion and which possesses sufficient textural integrity for subsequent processing in the production of a commercially sterile canned meat-containing product.

According to the present invention, an edible acidogen, that is, a compound which yields an edible acid upon hydrolysis or reaction with water, is dispersed substantially uniformly throughout a meat emulsion in an amount sufficient to reduce the pH of the emulsion to 4.6 or below prior to completion of cooking the emulsion. Since such an acidic pH would normally result in the acid denaturation and coagulation of the protein (myosin) coating surrounding the fat globules in the emulsion and thereby break or short the emulsion, acidification of the emulsion to such a low pH is delayed until the emulsion has been set by cooking. This is accomplished by incorporating a water soluble hydrocolloid in the emulsion together with the acidogen, to stabilize the protein in the emulsion to the acid stress which results open the generation of acid in the emulsion. Alternatively, acidification to such a low pH may be delayed by incorporating in the emulsion an encapsulated acidogen, such as an acidogen coated with an edible fat which has a melting point of about 130°–135° F.

After preparation of the meat emulsion, including the addition of the acidogen and hydrocolloid, or the encapsulated acidogen, the emulsion is formed into a desired shape, such as by filling into a suitable container, such as cans, casings, and the like, and cooked to coagulate the protein and set the emulsion. During this period, edible acid is generated substantially uniformly throughout the the emulsion due to hydrolysis of the acidogen or reaction of the acidogen with water in the emulsion, to reduce the pH of the emulsion to 4.6 or below.

The acidified, set emulsion is then cut into cubes, slices, strips, etc. and combined with other foods having a pH of 4.6 or below, such as acidified sauces, gravies, vegetables, etc. in a suitable container and heat processed under relatively mild conditions, such as 212° F. for 10 minutes. Since the pH of the meat emulsion and the other ingredients is 4.6 or below, the growth of *Clostridium botulinum* in the container will be inhibited, making it unnecessary to subject the container to move severe thermal processing. The resulting product is a commercially sterile, canned, meat containing product in which the flavor, texture, color and appearance of the meat and other ingredients are not adversely affected by the heat processing conditions.

DETAILED DESCRIPTION OF THE INVENTION

In general, the meat emulsion of the present invention is formed by conventional procedures which are well known in the meat processing industry. Meat emulsions are formed by chopping or comminuting a meat mix, containing a desired amount of lean meat and fat, with water, ice, salt, spices, curing salts and other additives, in order to solubilize meat proteins. The chopping treatment breaks up and disperses the fat in the protein slurry to form an emulsion. Thus, the solubilized meat proteins and water of the meat mixture form a matrix that surrounds the dispersed fat globules. The salt-soluble muscle protein, myosin, acts as the primary emulsifying agent, forming a strong protective membrane around the fat globules. The resulting emulsion is then heated so that the protein coagulates and sets solid to thereby entrap the dispersed fat globules in the protein matrix. In preparing meat emulsions, care must be exercised to avoid conditions which cause emulsion instability and result in "short" or broken emulsions. Breakdown of the emulsion enables the fat globules to coalesce and causes fat pocketing or greasing out of the emulsion, resulting in the production of an unsightly and unsatisfactory product. As is well known in the meat processing industry, such emulsion instability may be caused by overchopping, the use of short meat, rapid heating or other conditions which lead to the protein matrix being partially denatured and broken prior to cooking, giving rise to an unprotected fat dispersion.

Any of the meat mixes usually used in the production of meat emulsion products may be used in the present invention. The term "meat", as used herein, refers to edible skeletal and non-skeletal natural flesh from a variety of mammals (including cattle), fowl and fish. A wide variety of meats may be used, including lean or fat beef, pork, veal and mutton, such as whole-carcass bull and cow meat, whole-carcass mutton, shank meat, lean or regular pork trimmings, hearts, jowls, and beef briskets, deboned turkey meat, deboned chicken meat, fresh fish, and the like, and combinations of such meats.

Additives which are conventionally used in meat emulsion products may also be used in the present invention. Such additives include ice, salt, curing salts such as sodium or potassium nitrite and nitrate, antioxidants, spices, seasonings, sugar and the like. If desired, one or more vegetable protein products such as, for example, soy protein isolate, may also be included in the meat emulsion.

The meat and other constituents may be comminuted in one or more steps by conventional procedures, such as in an auger-type grinder followed by treatment in a mixer or blender, or may be further comminuted in a high speed shearing apparatus such as a silent cutter chopper, mince master, etc. to form the meat emulsion.

In accordance with the present invention, the meat emulsion is acidified to an equilibrium pH of 4.6 or below under conditions which prevent partial denaturation of the protein matrix of the emulsion prior to cooking of the emulsion. As used herein, "equilibrium pH" means the pH of the product as determined in accordance with the methodology set out in 21 CFR 114.90. Such acidification is accomplished by incorporating throughout the meat emulsion an acidogen, that is, a compound which yields an edible acid upon hydrolysis or reaction with water. Thus, the acidogen, which is distributed throughout the meat emulsion, slowly hydrolyzes or reacts with water in the emulsion to form an edible acid, which acid gradually reduces the pH of the emulsion to 4.6 or below. Acidogens which may be used in the present invention include lactones such as glucono delta lactone, gamma galactono lactone, lactobiono delta lactone, maltobiono delta lactone, and the like, and leavening acids such as sodium acid pyrophosphate, sodium aluminum phosphate, sodium aluminum sulfate, and the like, and combinations thereof. Generally it is preferred to utilize acidogens which hydrolyze or react substantially completely by the time cooking of the meat emulsion is completely but which do not generate substantial amounts of acid prior to cooking of the emulsion. The preferred acidogen is glucono delta lactone. About 25% of this lactone hydrolyzes in the first ten minutes after its addition, with the remainder hydrolyzing more slowly. The acidogen must, of course, hydrolyze or react to an extent sufficient to reduce the pH of the emulsion to 4.6 or below within the time the emulsion is cooked.

The acidogen may be added to or incorporated with the emulsion ingredients before, during, or after comminution and/or emulsification of the meat. For example, the acidogen may be added to the contents of a silent cutter at any stage, such as in its coarse comminuted stage, or its emulsifying state, with the point of addition depending in part upon the type of acidogen used (that is, how rapidly it hydrolyzes or reacts to form acid) and the period of time which elapses between addition of the acidogen and thermal processing of the emulsion. As noted above, substantial amounts of acid should not be generated prior to cooking of the emulsion so that the protein matrix remains substantially uncoagulated prior to such cooking.

It is essential that the amount of acidogen included in the meat emulsion be sufficient to reduce the pH of the emulsion to 4.6 or below within the time the emulsion is cooked. This amount will depend in part upon the pH of the meat used in the emulsion (raw meat varies in its pH ranging from about 5.3 to 6.0), the type and amount of additives included in the emulsion, the specific acidogen used and the processing conditions to which the emulsion is subjected. For these reasons, the minimum amount of acidogen will vary and cannot be precisely specified, except by its functions. However, the most suitable amounts may be readily determined for a specific emulsion formulation by making routine test runs. Similarly, the maximum amount of acidogen included in the emulsion will vary, and is limited primarily by the taste of the resulting product.

As noted hereinabove, a portion of the acidogen added to the emulsion hydrolyzes or reacts within a relatively short period of time, with the remainder hydrolyzing or reacting more slowly. For example, approximately 25% of glucono delta lactone hydrolyzes in the first 10 minutes. The addition of 500 mg. of this lactone to 100 ml. of water at 80° F. reduces the pH of the water to 4.2 in 5 minutes, 3.0 in 30 minutes and 2.8 in 60 minutes. Similar amounts of maltobiono delta lactone and lactobiono delta lactone, which are slower hydrolyzing lactones, result in a pH reduction to 4.2 and 3.8, respectively, in 5 minutes, and 3.2 and 3.5, respectively, in 16 hours. Although only a portion of the acidogen hydrolyzes rapidly, the amount of acid formed during such rapid hydrolysis would be sufficient to cause at least partial acid denaturation of the protein prior to cooking, thereby coagulating the protein and giving rise to an unprotected fat dispersion, and permit fat separation during cooking. In order to prevent such fat separation, it is essential that there be substantially no denaturation or coagulation of the protein by such free acid prior to cooking of the emulsion.

According to one embodiment of the invention, acid denaturation of the protein is prevented by incorporating an edible, water soluble hydrocolloid in the emulsion either prior to or with the addition of the acidogen. The hydrocolloid, upon inclusion in the emulsion, is hydrated and stabilizes the protein in the emulsion to the acid stress resulting from the presence of free acid in the emulsion. Thus the hydrocolloid becomes associated with the protein and prevents denaturation or coagulation of the protein matrix prior to heat curing of the emulsion, thereby preventing breakdown of the emulsion even in the presence of acid.

The hydrocolloid may be added to the meat emulsion ingredients prior to, during, or after formation of the emulsion, but must be added prior to or with the acidogen in order to ensure emulsion stability. If the hydrocolloid is added after the emulsion if formed, it must be intimately mixed throughout the emulsion.

The hydrocolloid is included in the meat emulsion in an amount sufficient to prevent acid denaturing of the protein prior to cooking, so there is no breaking or shorting of the emulsion when the pH of the meat emulsion is reduced to 4.6 or below. Ordinarily, the amount of hydrocolloid stabilizer required to accomplish this result will vary depending on the composition of the meat emulsion, the specific hydrocolloid used, and the type of acidulant used. Amounts in the range of about 0.1–0.3% by weight of the meat emulsion have been effective in preventing acid denaturing of the protein without unduly increasing the viscosity of the emulsion. Greater amounts may, of course, be used as long as they do not increase the viscosity of the emulsion to the point that the emulsion cannot be pumped or result in unacceptable product texture.

A wide variety of edible, water soluble hydrocolloids may be used in the present invention to prevent protein denaturation prior to cooking of the emulsion, including natural plant extrudates such as gum arabic, and gum tragacanth; plant seed gums such as guar gum and locust bean gum; carageenan; pectins; cellulose gums such as carboxymethylcellulose and methylcellulose; and the like, including mixtures thereof.

In accordance with another embodiment of the invention, denaturation and coagulation of the protein by the acid is prevented by the use of an acidogen which is encapsulated with an edible material which prevents or retards hydrolysis or reaction of the acidogen in the emulsion until cooking of the emulsion. For example, a lactone, in particulate form, coated with an edible fat having a melting point in the range to which the emulsion is heated during cooking, does not release any significant amount of acid when added to the emulsion. Hydrolysis of the acidogen and release of acid is thereby delayed until the emulsion has been heated to curing temperature, at which time setting of the emulsion has already begun. Excellent results have been obtained using particulate glucono delta lactone encapsulated in an edible fat, such as partially hydrogenated palm oil, having a melting point of between about 136° F. to 144° F., such as supplied by Durkee Industrial Foods under the designation DURKOTE GDL 135-50, which comprises approximately 50% by weight of the lactone and approximately 50% by weight of the fat coating. The acidogen may, of course, be coated with other edible fats, provided the fat has a bland or neutral flavor and a melting point in the range of about 100° F. to 150° F., so that the fat coating will remain intact prior to, but will be liquified and removed from around the acidogen during, cooking of the emulsion. Fats which may be used to encapsulate the acidogen include hydrogenated vegetable oils such As cottonseed oil, soybean oil, peanut oil, and the like, including mixtures thereof. Such encapsulated acidogens may be added to the meat emulsion ingredients either before, during, or after formation of the emulsion.

When emulsification of the meat mass is completed, including addition of the hydrocolloid and acidogen or encapsulated acidogen, the meat emulsion is formed into a desired shape, such as by being introduced into a suitable container, and cooked to heat coagulate the protein and set the emulsion. A variety of containers and thermal processing conditions may be used, depending upon the type of product desired. If a fat-encapsulated acidogen is included in the emulsion ingredients, it is essential that the emulsion be heated to an internal temperature above the melting point of the fat, so that the acidogen is available for hydrolysis or reaction with water in the emulsion. For example, if a sausage-type product is desired, the emulsion is filled into suitable casings and cooked to an internal temperature of about 150° F. to coagulate the protein and set the emulsion. The resulting product is microbiologically stable for extended periods of time when stored under refrigerated conditions. If desired, the meat emulsion may, alternatively, be filled into cans or other containers which are then sealed and subjected to thermal processing sufficient to destroy acid-tolerant microorganisms, such as by heating at about 212° F. to thereby produce a shelf-stable product.

During such heat processing, acid is generated throughout the emulsion due to hydrolysis or reaction of the acidogen to reduce the pH of the emulsion to 4.6 or below within the time the emulsion is cooked. Since the protein matrix of the emulsion is substantially heat coagulated by the time the emulsion is acidified to this pH, there is no localized acid denaturation of the protein which would give rise to an unprotected fat dispersion, so that the emulsion remains intact when at this low pH.

The acidified, set emulsion, upon completion of cooking, is particularly well suited for use in the production o shelf stable, sterile canned meat-containing products. Since the meat emulsion, upon completion of cooking, is acidified to an equilibrium pH of 4.6 or below substantially uniformly throughout the emulsion, it may be used in the production of sterile canned products which are heat processed under conditions which do not adversely affect the flavor, texture, color or appearance of the meat. Thus, the acidified meat emulsion, at a temperature of about 160° F. -175° F., is combined with other pre-heated acidic or acidified foods, in particulate or liquid form, that is, naturally occuring foods or processed foods having an equilibrium pH of 4.6 or below, in containers which are then sealed and subjected to heat processing for a period of time and at a temperature sufficient to destroy acid-tolerant microorganisms and other microorganisms of public health significance. Since all of the food contents of the container are at a pH of 4.6 or below, a temperature of about 160° F. to 200° F. throughout all of the food ingredients is sufficient to cause the destruction of acid tolerant organisms and other microorganisms of public health significance.

While the particular time and temperature relationship required to destroy such organisms will vary somewhat depending upon the pH of the foods, the type of food ingredients and the particle size of the food ingredients, a commercially sterile canned product can be produced by subjecting the sealed containers to a temperature of about 212° F. for about 10 to 15 minutes. Since the maximum temperature to which the meat and other food ingredients is subjected is 212° F., the taste, texture, color and appearance of the meat and other ingredients are not adversely affected. Upon completion of heat processing, the containers preferably are cooled so that the internal temperature of the containers is rapidly reduced to below about 125° F., in order to preserve the texture of the food particles.

A wide variety of foods may be combined with the acidified meat emulsion in the production of such commercially sterile, canned meat-contained products. Thus, one or more normally acidic foods, that is, a food which normally has a pH of 4.6 or below, may be combined with the acidified meat emulsion to produce a shelf-stable product. For example, sauerkraut, preheated to a temperature of about 160° F.-170° F., may be introduced into cans together with the acidified meat emulsion product in sausage form.

Similarly, one or more foods which normally have a pH of above 4.6 may also be used, provided they are first processed to reduce their pH to 4.6 or below. Such acidified low acid foods may be processed in accordance with U.S. Pat. No. 3,886,296, by blanching the food particles with a hot acidic solution to reduce their pH and are then combining them in a suitable container with the acidified meat emulsion product and an acidic liquid phase, such as a sauce, gravy, dressing, etc. having a pH of below 4.5.

The following examples are given to illustrate, but not to limit, the present invention. In these examples, and elsewhere herein, proportions and percentages are expressed as parts by weight.

EXAMLE I

The following meat emulsion was prepared as a control.

| Ingredient | Amount (grams) |
| --- | --- |
| Bull meat | 140 |
| Chuck | 800 |
| Beef heart | 120 |
| Beef flanks | 300 |

-continued

| Ingredient | Amount (grams) |
| --- | --- |
| Pork trimmings | 300 |
| Ice | 300 |
| Salt | 40 |
| Spice blend | 11 |
| Sodium nitrite | 0.24 |
| Ascorbic acid | 0.78 |

This control emulsion was prepared by placing the bull meat, chuck, beef heart, ice and a premixed blend of the salt, spice blend, sodium nitrite and ascorbic acid into a Hobart bowl chopper and chopping until a temperature of between 57° F.-63° F. was reached (approximately 15 minutes). At that time, the beef flanks and pork trimmings were added and chopping was continued until a temperature of 57° F.-63° F. was reached (approximately 10 minutes) to form a meat emulsion.

The emulsion thus formed was then stuffed into cellulose casings of about one inch in diameter. The emulsion was set by cooking in a temperature and humidity controlled smoker, using steam to provide about 50% relative humidity during cooking, according to the following schedule:

45 minutes at 135° F.
45 minutes at 150° F.
30 minutes at 170° F.
3 minutes at 180° F. (full steam)

Upon completion of cooking the resulting set emulsion was cooled to 40° F. to produce a conventional sausage product.

Three acidified meat emulsion products were prepared in accordance with the formulation and procedure used in preparing the control emulsion. Thus, the formulation and procedure set out above was used with the following exceptions: In the first acidified emulsion (AE-1), an acidogen and a stabilizer were included in the emulsion. In the preparation of this emulsion, carboxymethylcellulose was added, at a level of 0.2% of the total formulation, to the premixed blend of salt, spice blend, sodium nitrite and ascorbic acid prior to the addition of the blend to the Hobart Bowl chopper and, upon completion of the second chopping, glucono delta lactone was added to the chopper at a level of 1.25% of the total formulation. After thoroughly mixing the acidogen throughout the emulsion, the emulsion was stuffed into casings and cooked in the same manner as the control emulsion.

The second acidified emulsion (AE-2) was prepared using an encapsulated acidogen. Thus, glucono delta lactone having a coating of partially hydrogenated palm oil (m.p. 136° F.-144° F.), supplied by Durkee Industrial Foods Group under the designation DURKOTE GDL 135-50, was added to the chopper at a level of 2.5% of the formulation, upon completion of the second chopping. After mixing in the encapsulated acidogen, the emulsion was stuffed into casings and cooked the same as the control.

The third acidified emulsion (AE-3) was prepared using an acidogen but no hydrocolloid. Glucons delta lactone was added to the chopper at a level of 1.25% of the formulation upon completion of the second chopping. After mixing in the acidogen, the emulsion was stuffed into casings and cooked the same as the control. The results obtained are set out in the following table:

| Emulsion | pH of Cooked Emulsion | Results |
|---|---|---|
| Control | 6.0 | Emulsion stable; no fat separation |
| AE-1 | 4.55 | Emulsion stable; no fat separation; similar in appearance to control |
| AE-2 | 4.55 | Emulsion stable; no fat separation; similar in appearance to control |
| AE-3 | 4.55 | Emulsion not stable; fat pockets formed at ends of sausage; product was unsightly and unsatisfactory. |

Thus, meat emulsions AE-1 and AE-2, which were produced in accordance with the present invention, were stable and exhibited no fat separation or other signs of emulsion instability, even though the pH of the emulsions were at a level which would be expected to produce breaking of the emulsion, giving rise to fat separation.

Emulsion AE-3 shows the importance of preventing coagulation of the protein matrix prior to cooking. Thus, when a hydrocolloid or an encapsulated acidogen are not used, the initial hydrolysis of the acidogen produces sufficient acid prior to cooking so that the protein matrix is partially coagulated and broken giving rise to an unprotected fat dispersion. This results in fat separation during cooking and production of an unsatisfactory product.

EXAMPLE II

Commercially sterile, canned meat containing products were prepared using the stable sausage products produced in Example I, that is, one product was made using the control emulsion sausage, another using the AE-1 emulsion sausage, and a third using the AE-2 emulsion sausage. In each instance the sausage product was cut into slices which were steamed for 3 minutes to increase the meat temperature to about 160° F. and a standard amount of the sausage slices was mixed with a standard amount of an acidified salad dressing which had been preheated to about 160° F. The same salad dressing was mixed with each of the sausage products and had the following formulation:

| Ingredient | Percent |
|---|---|
| Cottonseed oil | 40.0 |
| Water | 35.3 |
| Sugar | 16.0 |
| Salt | 4.0 |
| Egg yolk solids | 2.0 |
| Monosodium glutamate | 0.5 |
| Carrageenan | 0.2 |
| Malic acid | 0.1 |
| Flavorings | 1.9 |

The dressing, which had a pH of 4.4, was prepared by mixing the ingredients and homogenizing the mixture.

The mixture of sausage slices in salad dressing was placed into 401×105 cans, which were sealed and heat processed under conditions to give a commercially sterile product. Thus, the cans containing the control emulsion slices were retorted at 250° F. for 75 minutes to ensure product sterility, since the pH of the meat was above 4.6. The cans containing AE-1 and AE-2 sausage slices were atmospherically steamed for 10 minutes to produce a commercially sterile product. After cooling, the cans were opened and the contents examined. The two acidified products (i.e. the products containing slices of AE-1 and AE-2 sausage) withstood thermal processing very well. The texture, flavor and appearance of the meat and the salad dressing were not adversely affected by thermal processing. However, the product containing the control emulsion sausage slices was significantly adversely affected by thermal processing and was unacceptable. Not only had the meat slices lost their texture, but the salad dressing emulsion had also broken as evidenced by gross oiling-off. The dressing emulsion along with the meat could not withstand the high heat treatment required to insure commercial sterility.

EXAMPLE III

An acidified sausage product was prepared using the following ingredients:

| | |
|---|---|
| Deboned turkey thighs | 4 lbs. |
| Deboned turkey breasts | 4 lbs. |
| Pork trim | 2 lbs. |
| Ice | 2 lbs. |
| Spice blend | 0.58 lbs. |
| Acidogen (glucono delta lactone) | 0.25 lbs. |
| Hydrocolloid (carboxy methyl cellulose) | 0.03 lbs. |

The pork trim and deboned turkey meat were ground in an auger-type grinder and extruded through a ¼″ die. The ground meat mix was then combined with the remainder of the ingredients and the mix minced in a Hobart bowl chopper to form an emulsion which was stuffed into cellulosic casings approximately two inches in diameter. The stuffed casings were cooked for 1 hour at 140° F. and 1 hour at 180° F., at which time the sausages had an internal temperature of 148° F. The cooked sausages were then cooled in tap water and stored at 38° F.

The resulting sausages had a fibrous, meat-like texture and showed no evidence of shorting or breaking of the emulsion. This product was comparable in texture to a control product made using the same formulation and procedure with the exception that the control product did not contain an acidogen or hydrocolloid. Similar results are obtained using a combination of acidogens in the meat emulsion, such as glucono delta lactone and sodium acid pyrophosphate.

Although the present invention has been described with reference to specific examples, it will be understood that changes, modifications and variations of composition and procedure may be made by those skilled in the art within the principle and scope of the invention as set forth in the appended claims.

What is claimed is:

1. A method of producing a stable, acidified meat emulsion product which consists essentially of
   comminuting a meat mix containing lean meat, fat and water under conditions sufficient to form a meat emulsion in which fat globules are dispersed in a matrix of meat protein,
   incorporating in the meat emulsion ingredients an edible acidogen to form an edible acid throughout the emulsion, said acidogen being incorporated in the meat emulsion ingredients in an amount sufficient to lower the pH of the emulsion to 4.6 or below within the period of time the emulsion is heated to set the emulsion, and from about 0.1% to 0.3% by weight of an edible hydrocolloid selected from the group consisting of natural plant extrudates, plant seed gums, carrageenan, pectin, cellulose gums and combinations thereof, whereby breakdown of the emulsion due to the presence of acid in the emulsion is prevented, and heating the emulsion in the presence of acid formed in the emulsion from said acidogen to an internal temperature of at least 150° F. for a period of time sufficient to heat coagulate the meat protein and set the emulsion, thereby providing an acidified meat emulsion product.

2. The method defined in claim 1 in which the acidogen is a lactone which hydrolyzes in water in the emulsion to form an edible acid throughout the emulsion, with the rate of hydrolysis of the lactone being such that substantial amounts of acid are not formed prior to heating the emulsion, but sufficient acid is formed to lower the pH of the emulsion to 4.6 or below prior to completion of heating of the emulsion.

3. The method defined in claim 2 in which the lactone is selected from the group consisting of glucono delta lactone, gamma galacto lactone, lactobiono delta lactone, and maltobiono delta lactone.

4. The method defined in claim 1 in which the acidogen is a leavening acid which reacts with water in the emulsion to form an edible acid throughout the emulsion, with the rate of reaction of the leavening acid being such that substantial amounts of acid are not formed prior to heating the emulsion, but sufficient acid is formed to lower the pH of the emulsion to 4.6 or below prior to completion of heating of the emulsion.

5. The method defined in claim 4 in which the leavening acid is selected from the group consisting of sodium acid pyrophosphate, sodum aluminum phosphate, and sodium aluminum sulfate.

6. The method defined in claim 1 in which the emulsion is filled into a container which is then sealed and heated at a temperature of about 212° F. for a period of time sufficient to destroy acid-tolerant microorganisms in the emulsion whereby the meat protein in the emulsion is heat coagulated and a shelf-stable, acidified meat emulsion product is produced.

7. The method defined in claim 1 in which the acidogen is incorporated in the meat emulsion ingredients before comminution of the meat mix to form said emulsion, and the edible hydrocolloid is incorporated in the meat emulsion ingredients prior to or with the incorporation of said acidogen.

8. The method defined in claim 1 in which the acidogen is incorporated in the meat emulsion ingredients during comminution of the meat mix to form said emulsion, and the edible hydrocolloid is incorporated in the meat emulsion ingredients prior to or with the incorporation of said acidogen.

9. The method defined in claim 1 in which the acidogen is incorporated in the meat emulsion ingredients, with mixing, after comminution of the meat mix to form said emulsion, and the edible hydrocolloid is incorporated in the meat emulsion ingredients prior to or with the incorporation of said acidogen.

10. The method defined in claim 1 in which the acidogen is glucono delta lactone and the hydrocolloid is carboxymethylcellulose.

11. A method of producing a sterile, shelf-stable canned food product containing a meat emulsion product which consists essentially of comminuting a meat mix containing less meat, fat and water under conditions sufficient to form a meat emulsion in which fat globules are dispersed in a matrix of meat proteins, incorporating in the meat emulsion ingredients an edible acidogen to form an edible acid throughout the emulsion, said acidogen being incorporated in the meat emulsion ingredients in an amount sufficient to lower the pH of the emulsion to 4.6 or below within the period of time the emulsion is heated to set the emulsion, and from about 0.1% to 0.3% by weight of an edible hydrocolloid selected from the group consisting of natural plant extrudates, plant seed gums, carrageenan, pectin, cellulose gums, and combinations thereof, whereby breakdown of the emulsion due to the presence of acid is prevented, heating the emulsion in the presence of acid formed in the emulsion from said acidogen to an internal temperature of at least 150° F. for a period of time sufficient to heat coagulate the meat protein and set the emulsion, thereby providing an acidified meat emulsion product having a pH of 4.6 or below, combining said acidified, set meat emulsion, while at a temperature of between about 160° F. to 175° F., in a container with another food material having a pH of 4.6 or below and having a temperature of between about 160° F. to 175° F., sealing the container, and heat processing the sealed container at a maximum temperature of 212° F. for a period of time sufficient to destroy acid tolerant microorganisms and other microorganisms of public health significance and thereby produce a sterile, shelf-stable canned product.

12. The method defined in claim 11 in which the sealed container is heated at 212° F. for 10 to 15 minutes to produce a sterile, shelf-stable product.

13. The method defined in claim 11 in which the acidogen is a lactone which hydrolyzes in water in the emulsion to form an edible acid throughout the emulsion, with the rate of hydrolysis of the lactone being such that substantial amounts of acid are not formed prior to heating the emulsion, but sufficient acid is formed to lower the pH of the emulsion to 4.6 or below prior to completion of heating of the emulsion.

14. The method defined in claim 13 in which the lactone is selected from the group consisting of glucono delta lactone, gamma galacto lactone, lactobiono delta lactone, and maltobiono delta lactone.

15. The method defined in claim 11 in which the acidogen is a leavening acid which reacts with water in the emulsion to form an edible acid throughout the emulsion, with the rate of reaction of the leavening acid being such that substantial amounts of acid are not formed prior to heating the emulsion, but sufficient acid if formed to lower the pH of the emulsion to 4.6 or below prior to completion of heating of the emulsion.

16. The method defined in claim 15 in which the leavening acid is selected from the group consisting of sodium acid pyrophosphate, sodium aluminum phosphate, and sodium aluminum sulfate.

17. The method defined in claim 11 in which the acidogen is glucono delta lactone and the hydrocolloid is carboxymethylcellulose.

18. The method defined in claim 11 in which the acidogen is incorporated in the meat emulsion ingredients before comminution of the meat mix to form said emulsion, and the edible hyrdocolloid is incorporated in the meat emulsion ingredients prior to or with the incorporation of the acidogen.

19. The method defined in claim 11 in which the acidogen is incorporated in the meat emulsion ingredients during comminution of the meat mix to form said emulsion, and the edible hydrocolloid is incorporated in the meat emulsion prior to or with the incorporation of said acidogen.

20. The method defined in claim 11 in which the acidogen is glucono delta lactone and the hydrocolloid is carboxymethylcellulose.

21. A stable, acid meat emulsion product formed from a meat mix containing lean meat, fat and water which consists essentially of a dispersion of fat globules in a coagulated protein matrix, sufficient edible acid distributed substantially throughout the protein matrix to provide the emulsion with a pH of 4.6 or below, and from 0.1% to 0.3% by weight of an edible hydrocolloid selected from the group consisting of natural plant extrudates, plant seed gums, carrageenan, pectin, cellulose gums and combinations thereof and produced by the process of claim 13.

22. The meat emulsion product defined in claim 21 in which acid-tolerant microorganisms in the emulsion have been destroyed by subjecting the meat emulsion to thermal processing at a maximum temperature of 212° F., to provide a shelf-stable emulsion product.

23. The meat emulsion product defined in claim 21 in which the edible acid is an acid formed in situ in the meat emulsion by the hydrolysis of a lactone selected from the group consisting of glucono delta lactone, gamma galacto lactone, lactobiono delta lactone, and maltobiono delta lactone.

24. The meat emulsion product defined in claim 21 in which the edible acid is an acid formed in situ in the meat emulsion by the reaction with water of a leavening acid selected from the group consisting of sodium acid pyrophosphate, sodium aluminum phosphate and sodium aluminim sulfate.

* * * * *

UNITED STATES PATENT OFFICE
CERTIFICATE OF CORRECTION

PATENT NO. : 4,262,027
DATED : April 14, 1981
INVENTOR(S) : George F. Tonner and John M. Wolcott It is certified that error appears in the above-identified patent and that said Letters Patent are hereby corrected as shown below:

Column 6, line 66, "o" should read -of-.

Column 8, line 63, "Glucons" should read "Glucono-.

Claim 5, line 3, "sodum" should read -sodium-.

Claim 21, last line, the claim reference numberal "13" should read -1-.

Signed and Sealed this

Thirtieth Day of June 1981

[SEAL]

Attest:

RENE D. TEGTMEYER

Attesting Officer     Acting Commissioner of Patents and Trademarks